March 13, 1951  S. EKKELKAMP  2,544,953
EMERGENCY BRAKE WARNING
Filed Jan. 30, 1950  2 Sheets-Sheet 2

Sienus Ekkelkamp
INVENTOR.

BY Clarence A. O'Brien
and Harvey B. Jacobson
Attorneys

Patented Mar. 13, 1951

2,544,953

UNITED STATES PATENT OFFICE 2,544,953

EMERGENCY BRAKE WARNING

Sienus Ekkelkamp, Everett, Wash.

Application January 30, 1950, Serial No. 141,325

4 Claims. (Cl. 116—114)

This invention relates to improvements in devices for indicating whether the emergency brake system of a vehicle is set.

An object of this invention is to block the vision of a vehicle operator when the emergency brake of his vehicle is set in a position which locks the wheels of the vehicle or partially locks them.

Another object of this invention is to operate a gear train in response to movement of a brake lever of the vehicle and by virtue of the gear train operation and through a crank, reciprocate a rod which has a signal panel at the upper end thereof, the rod being so disposed that when the panel is raised, it at least partially blocks the vision of the vehicle operator.

Other objects and features will become apparent in following the description of the illustrated form of the invention.

Figure 1:
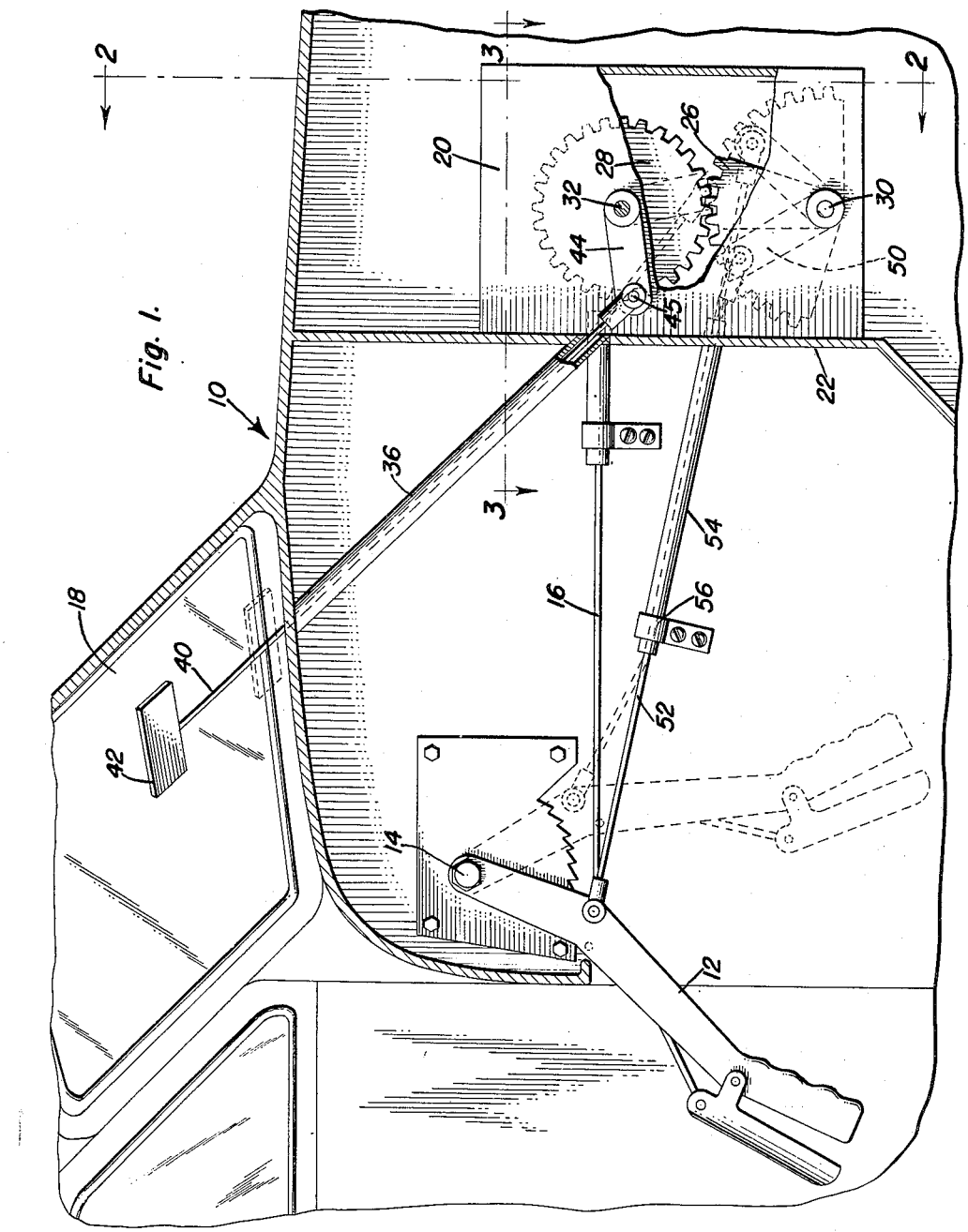
Figure 1 is a sectional view showing a fragmentary portion of a vehicle and the attachment mounted therein.
Figure 2:
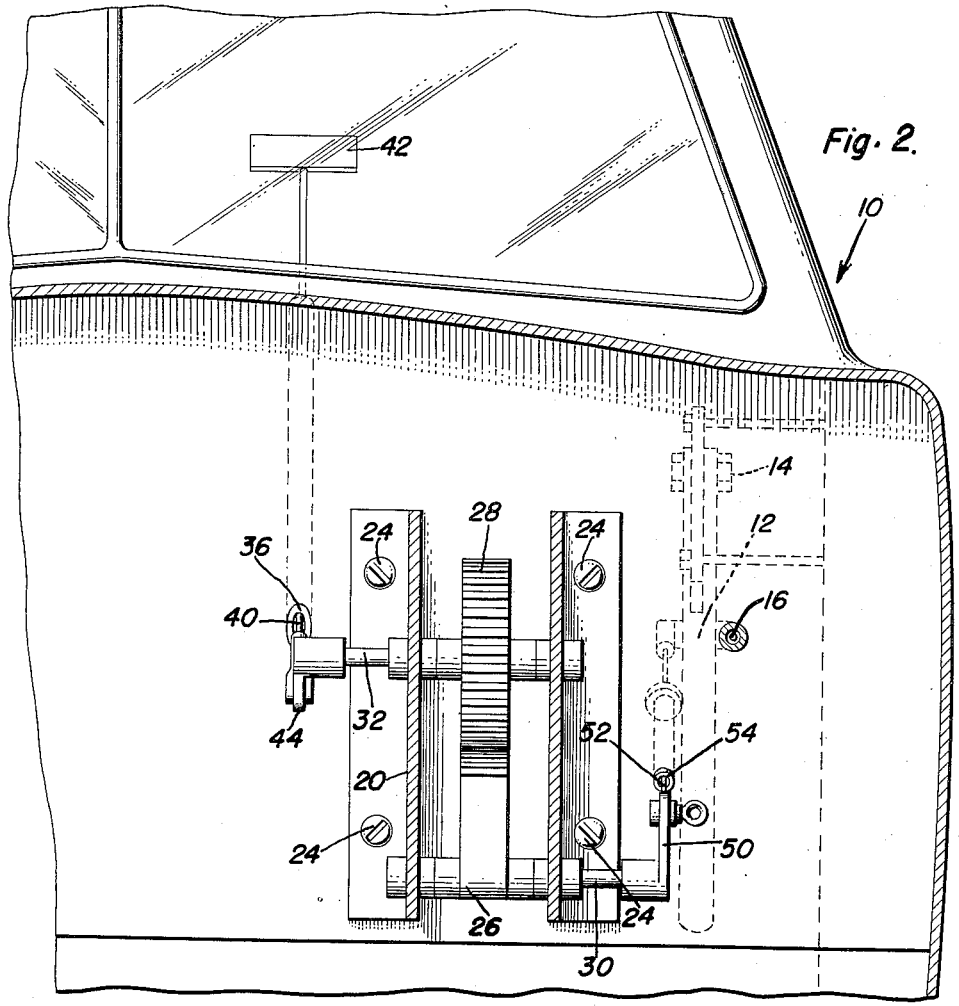
Figure 2 is a sectional view taken substantially on the line 2—2 of Figure 1 and in the direction of the arrows.
Figure 3:
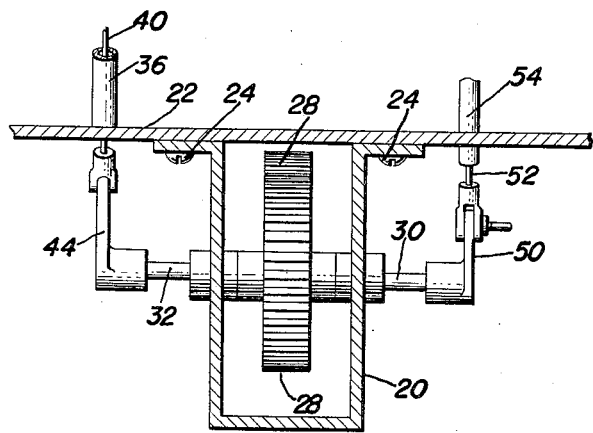
Figure 3 is a sectional view taken substantially on the line 3—3 of Figure 1 and in the direction of the arrows, portions of the conventional brake mechanism being omitted.

A conventional vehicle generally indicated at 10 is illustrated in the drawings fragmentarily and as portions of the conventional structure, there is a brake lever 12 pivoted by the pin 14. The brake cable 16 is attached in a conventional manner for application of other portions of the braking system of the vehicle.

A windshield 18 is illustrated in the appropriate place, that is, above the dash board 19.

The attachment is in part, carried by a support 20 which in the illustrated instance is secured to the fire wall 22 of the vehicle. Other parts of the conventional vehicle structure may be used to accommodate the support and conventional fastening devices, as the screws 24 which are employed for holding the support in place.

The shape of the support is not of major importance, there being illustrated a U-shaped (cross section) housing so that the quadrant 26 and gear 28 may be protected.

The quadrant and gear are in mesh and mounted on shafts 30 and 32 respectively. The shaft 32 passes through one wall of the receptacle or housing 20 and the shaft 30 passes through the other wall thereof. Suitable bearings are employed to provide necessary smooth surfaces for rotation of the shafts 30 and 32.

An open ended tube 36 has its bore disposed adjacent the housing 20 after passing through the fire wall 22. The upper end of the tube opens through a suitable passage formed in the dash board 19 of the vehicle or an equivalent or appropriate structure adjacent the windshield 18.

The tube 36 acts as a guide for the rod 40 which is mounted for reciprocation therein. The rod is of sufficient length that when it is moved outwardly of the tube 36 the indicator or signal element or member 42 is in the line of vision of the operator of the vehicle. The signal element is preferably in the form of a plate as disclosed in Figure 1.

An arm 44 which serves the purpose of a crank is secured to one end of the shaft 32 exteriorly of the housing 20. A pivot pin 45 connects the lower end of the rod 40 with the crank 44 so that rotation of the gear 28 which is fixed to the shaft 32 causes reciprocation of the rod 40. Sufficient play is provided at the pivot pin 45 and is present to allow the rod 40 to reciprocate. The material of the rod is chosen as such that it will flex rather easily. This taken together with the play at the pivot pin 45 allows the major part of the rod to reciprocate even though the lower end thereof may be flexed slightly so that it will have some movement which deviates from exact rectilinear movement.

The shaft 30 has a link 50 secured thereto exterior of the housing 20 and this link also acts in the nature of a crank. It is pivoted to the longitudinal connecting member or element 52 which may be a flexible rod or cable. A sheath 54 is secured by means of the clamp 56 to a part of the vehicle structure and has the cable 52 passed therethrough. This sheath has one end opening adjacent the housing as does the tube 36.

Inasmuch as one end of the cable or longitudinal connecting member 52 is secured to the lever 12, operation of the lever causes the cable 52 to be actuated. As the brake lever 12 is moved, for example, to the dotted position as shown in Figure 1, the cable 52 is pushed forwardly thereby causing the lever 50 to move to a second position as also shown in phantom. This rotates the shaft 30 and in turn rotates the quadrant 26. However, as the quadrant is rotated, the gear 28 which is inmeshed therewith is also rotated.

This rotation is imparted to the shaft 32, causing movement of the crank 44. As the crank moves to the position shown in dotted lines in Figure 1, the rod 40 is pulled inwardly of the tube 36. This pulls the signal element 42 downwardly to a position other than in the direct line of the vision of the operator of the vehicle.

When the brake lever 12 is moved in the opposite direction, the rod 40 will be urged outwardly of its tube 36 causing the signal panel or plate 42 to be disposed along side of the part of the windshield which will hinder direct vision therethrough. This draws attention to the vehicle operator that the brake system of the vehicle is set in the brake applying position.

With this signal given, it is not likely that the vehicle operator will attempt to move the vehicle without first releasing the brake system by actuating the lever 12 properly and to the proper position.

Having described the invention, what is claimed as new is:

1. In a vehicle which has a brake lever and a windshield, an indicator for the position of the brake lever comprising a rod with means mounting said rod on the vehicle for movement to a position to impede vision through the windshield, a signal member carried by said rod and movable with said rod, and means secured to said lever and operatively connected with said rod for actuating said rod.

2. In a vehicle which has a brake lever and a windshield, an indicator for the position of the brake lever comprising a rod with means mounting said rod on the vehicle for movement to a position to impede vision through the windshield, a signal member carried by said rod and movable with said rod to a position in the line of vision of the operator of the vehicle while seated in the operator's position, and means secured to said lever and operatively connected with said rod for actuating said rod including a sheathed longitudinal member, a gear train mounted on brackets, a crank connecting said longitudinal member with one of the gears of said train, and a crank secured to another gear of the train and to said rod to transmit movement from the gears of said train to said rod.

3. The combination of claim 2 and said mounting means comprising a tube having a bore with said rod slidably disposed in said bore.

4. In combination with a vehicle having a brake lever and a windshield, a support secured to another part of the vehicle, a tube having one end opening toward said support and the opposite end opening adjacent the windshield, a rod reciprocatingly disposed in said tube and having a signal element at one end operable to a position in front of the windshield drawing the attention of the vehicle operator when said rod is passed outwardly of said tube, a longitudinal member secured at one end to the brake lever for movement therewith, and means carried by said support and secured to the other end of said longitudinal member and to said rod for transmitting movement of said longitudinal member to movement of said rod.

SIENUS EKKELKAMP.

REFERENCES CITED

The following references are of record in the file of this patent:

UNITED STATES PATENTS

| Number | Name | Date |
| --- | --- | --- |
| 1,623,472 | Gurney | Apr. 5, 1927 |
| 2,361,361 | Sarnes | Oct. 24, 1944 |